(12) United States Patent
Komamine et al.

(10) Patent No.: US 11,972,611 B2
(45) Date of Patent: Apr. 30, 2024

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Aichi-ken (JP)

(72) Inventors: Satoshi Komamine, Nagoya (JP); Yurika Tanaka, Yokosuka (JP); Kenichi Yamada, Nisshin (JP); Ryuichi Kamaga, Nisshin (JP); Ai Miyata, Okazaki (JP); Yu Nagata, Chofu (JP); Shintaro Matsutani, Kariya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 450 days.

(21) Appl. No.: 17/361,324

(22) Filed: Jun. 29, 2021

(65) Prior Publication Data
US 2022/0004736 A1 Jan. 6, 2022

(30) Foreign Application Priority Data

Jul. 1, 2020 (JP) .................... 2020-113968

(51) Int. Cl.
| | |
|---|---|
| G06F 3/01 | (2006.01) |
| B64C 39/02 | (2023.01) |
| G06T 7/70 | (2017.01) |
| G06V 20/17 | (2022.01) |
| G06V 20/52 | (2022.01) |
| B64U 101/30 | (2023.01) |

(52) U.S. Cl.
CPC ............ *G06V 20/52* (2022.01); *B64C 39/024* (2013.01); *G06T 7/70* (2017.01); *G06V 20/17* (2022.01); *B64U 2101/30* (2023.01); *G06T 2207/30181* (2013.01)

(58) Field of Classification Search
CPC ........ G06V 20/52; G06V 10/40; G06F 3/013; G06Q 30/201; G06Q 30/0252; G09G 5/37
See application file for complete search history.

(56) References Cited

U.S. PATENT DOCUMENTS

| | | | |
|---|---|---|---|
| 2019/0094037 | A1 | 3/2019 | Jin et al. |
| 2021/0180973 | A1 | 6/2021 | Jin et al. |
| 2022/0215666 | A1* | 7/2022 | Furuhata ................. G06T 7/20 |

FOREIGN PATENT DOCUMENTS

| | | |
|---|---|---|
| CN | 109540121 A | 3/2019 |
| CN | 111027540 A | 4/2020 |
| JP | 201716388 A | 1/2017 |
| JP | 2017228115 A | 12/2017 |
| JP | 2019057216 A | 4/2019 |
| JP | 202035092 A | 3/2020 |

* cited by examiner

*Primary Examiner* — Phuoc H Doan
(74) *Attorney, Agent, or Firm* — HAUPTMAN HAM, LLP (57) ABSTRACT

A controller is provided that is configured to perform: obtaining information about a condition for an image that is provided to a user, and that corresponds to a preference of the user; specifying at least one predetermined position at which an image satisfying the condition can be taken; and generating a command for a moving object to move to the predetermined position and to take an image, and transmitting the command to the moving object.

14 Claims, 10 Drawing Sheets

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-113968, filed on Jul. 1, 2020, which is hereby incorporated by reference herein in its entirety.

BACKGROUND

Technical Field

The present disclosure relates to an information processing apparatus, an information processing method, and a non-transitory storage medium.

Description of the Related Art

There has been known a technology that collects images in an area, receives a search condition and a display format for images from a user terminal of a user, edits a search result based on the display format, and transmits the search result thus edited to the user terminal, thereby allowing the user to browse the images in the search result in an album format (for example, refer to Patent Literature 1).

CITATION LIST

Patent Literature

Patent Literature 1: Japanese Patent Application Laid-Open Publication No. 2017-016388
Patent Literature 2: Japanese Patent Application Laid-Open Publication No. 2020-035092

SUMMARY

An object of the present disclosure is to take images according to a preference of a user.

One aspect of the present disclosure is directed to an information processing apparatus including a controller configured to execute:
   obtaining information about a condition for an image that is provided to a user, and that corresponds to a preference of the user;
   specifying a predetermined position at which an image satisfying the condition can be taken; and
   generating a command for a moving object to move to the predetermined position and to take an image, and transmitting the command to the moving object.

Another aspect of the present disclosure is directed to an information processing method for causing a computer to perform:
   obtaining information about a condition for an image that is provided to a user, and that corresponds to a preference of the user;
   specifying a predetermined position at which an image satisfying the condition can be taken; and
   generating a command for a moving object to move to the predetermined position and to take an image, and transmitting the command to the moving object.

A further aspect of the present disclosure is directed to a non-transitory storage medium storing a program configured to cause a computer to perform:
   obtaining information about a condition for an image that is provided to a user, and that corresponds to a preference of the user;
   specifying a predetermined position at which an image satisfying the condition can be taken; and
   generating a command for a moving object to move to the predetermined position and to take an image, and transmitting the command to the moving object.

A still further aspect of the present disclosure is directed to the program described above.

According to the present disclosure, it is possible to take an image according to a preference of the user.

DESCRIPTION OF THE EMBODIMENTS

A controller included in an information processing apparatus, which is one aspect of the present disclosure, obtains information about a condition for images that are to be provided to a user and correspond to a preference of the user. This condition is a condition under which it is possible to determine what kind of images should be provided to the user. Information about this condition includes information about the user's preference. For example, images posted by the user to a social networking service (SNS) in the past may be obtained as the information about this condition. In addition, the controller specifies a predetermined location or position at which an image satisfying the condition can be taken. The predetermined position is a position at which an image to be provided to the user can be taken. For example, an image satisfying the above condition is extracted from among images posted to the SNS by third parties, and a location or position at which the image is taken is obtained as the predetermined position. Then, the controller generates a command for a moving object to move to the predetermined position and to take an image, and transmits the command to the moving object. The moving object is, for example, a vehicle or a drone, and is capable of moving autonomously. The moving object autonomously moves so as to take images at the predetermined position.

Hereinafter, embodiments of the present disclosure will be described based on the accompanying drawings. The configurations of the following embodiments are examples, and the present disclosure is not limited to the configurations of the embodiments. In addition, the following embodiments can be combined with one another as long as such combinations are possible and appropriate.

First Embodiment

Figure 1:
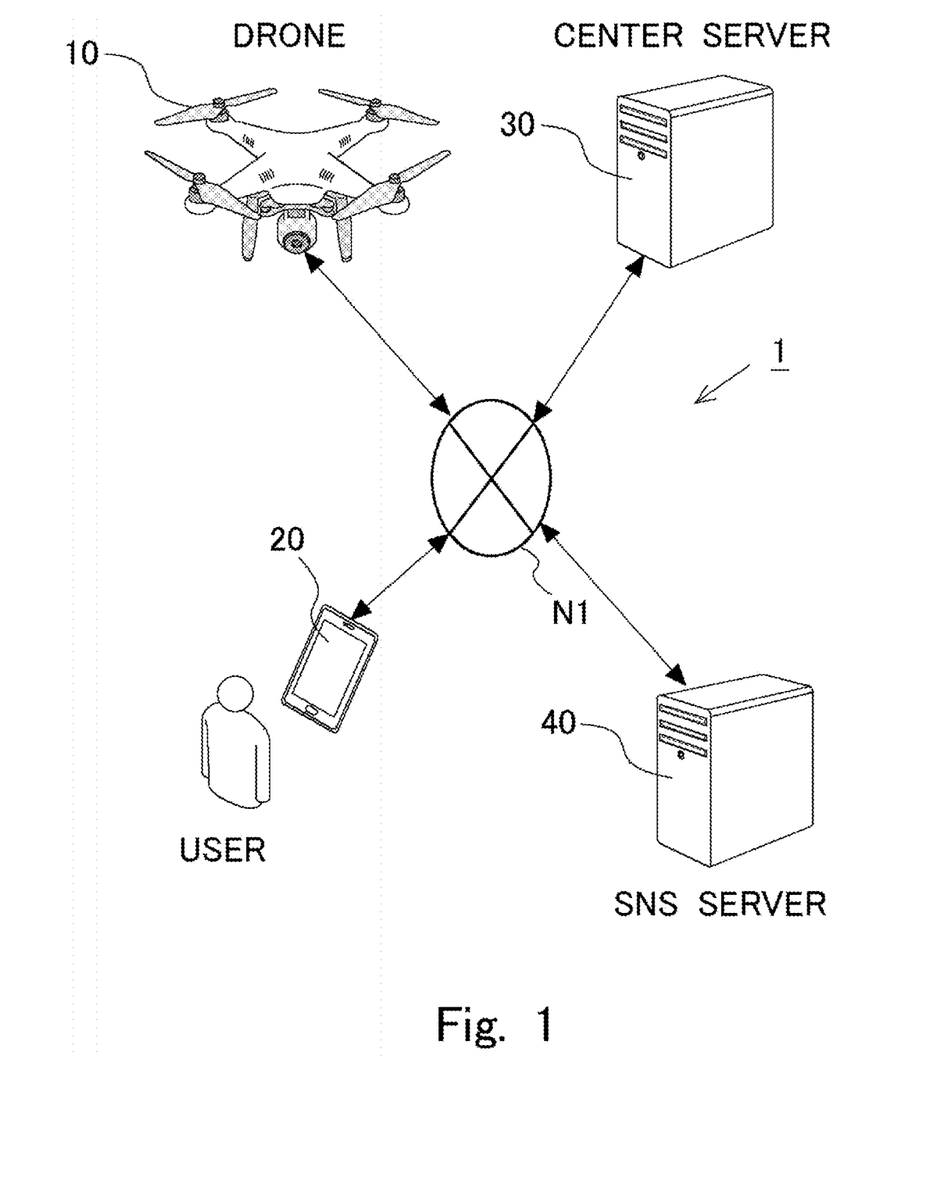
FIG. 1 is a diagram illustrating a schematic configuration of a system according to an embodiment.

FIG. 1 is a diagram illustrating a schematic configuration of a system 1 according to a first embodiment. The system 1 is a system in which a drone 10 autonomously moves to a place or location where it can take images preferred by a user, takes the images, and provides those images to the user. The drone 10 is an example of a moving object.

In the example of FIG. 1, the system 1 includes the drone 10, a user terminal 20, a center server 30, and an SNS server 40. The drone 10, the user terminal 20, the center server 30, and the SNS server 40 are connected to one another by means of a network N1. The drone 10 is capable of autonomously moving. The user terminal 20 is a terminal that is used by a user. The user terminal 20 is a terminal that allows the user to post to the SNS and to view or browse the SNS.

The network N1 is, for example, a worldwide public communication network such as the Internet or the like, and a WAN (Wide Area Network) or other communication networks may be adopted. In addition, the network N1 may include a telephone communication network such as a mobile phone network or the like, or a wireless communication network such as Wi-Fi (registered trademark) or the like. Here, note that FIG. 1 illustrates one drone 10 and one user terminal 20 by way of example, but there can be a plurality of drones 10 and a plurality of user terminals 20.

Figure 2:
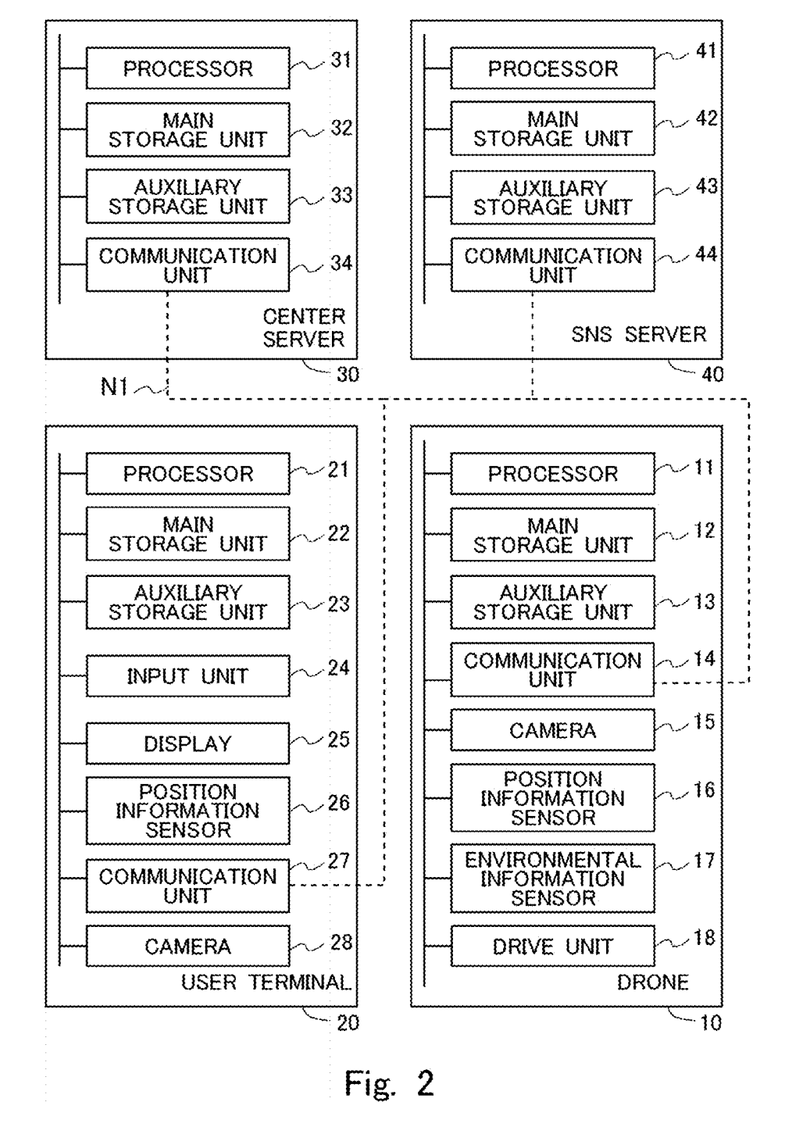
FIG. 2 is a block diagram schematically illustrating an example of a configuration of each of a drone, a user terminal, a center server and an SNS server, which together constitute the system according to the embodiment.

The hardware configurations and functional configurations of the drone 10, the user terminal 20, the center server 30, and the SNS server 40 will be described based on FIG. 2. FIG. 2 is a block diagram schematically illustrating one example of the configuration of each of the drone 10, the user terminal 20, the center server 30 and the SNS server 40, which together constitute the system 1 according to the present embodiment.

The center server 30 has a configuration of a general computer. The center server 30 includes a processor 31, a main storage unit 32, an auxiliary storage unit 33, and a communication unit 34. These components are connected to one another by means of a bus.

The processor 31 is a CPU (Central Processing Unit), a DSP (Digital Signal Processor), or the like. The processor 31 controls the center server 30 thereby to perform various information processing operations. The processor 31 is an example of a controller. The main storage unit 32 is a RAM (Random Access Memory), a ROM (Read Only Memory), or the like. The auxiliary storage unit 33 is an EPROM (Erasable Programmable ROM), a hard disk drive (HDD), a removable medium, or the like. The auxiliary storage unit 33 stores an operating system (OS), various programs, various tables, and the like. The processor 31 loads the programs stored in the auxiliary storage unit 33 into a work area of the main storage unit 32 and executes the programs, so that each of the component units or the like is controlled through the execution of the programs. Thus, the center server 30 realizes functions matching with predetermined purposes, respectively. The main storage unit 32 and the auxiliary storage unit 33 are computer-readable recording media. Here, note that the center server 30 may be a single computer or a plurality of computers that cooperate with one another.

In addition, the information stored in the auxiliary storage unit 33 may be stored in the main storage unit 32. Also, the information stored in the main storage unit 32 may be stored in the auxiliary storage unit 33.

The communication unit 34 is a means or unit that communicates with the drone 10, the user terminal 20, and the SNS server 40 via the network N1. The communication unit 34 is, for example, a LAN (Local Area Network) interface board, a wireless communication circuit for radio or wireless communication, or the like. The LAN interface board or the wireless communication circuit is connected to the network N1.

Next, the drone 10 is a moving object capable of autonomously flying based on a command received from the center server 30. The drone 10 is, for example, a multicopter. The drone 10 includes a processor 11, a main storage unit 12, an auxiliary storage unit 13, a communication unit 14, a camera 15, a position information sensor 16, an environmental information sensor 17, and a drive unit 18. These components are connected to one another by means of a bus. The processor 11, the main storage unit 12, and the auxiliary storage unit 13 are the same as the processor 31, the main storage unit 32, and the auxiliary storage unit 33 of the center server 30, respectively, and hence, the description thereof will be omitted. The processor 11 is an example of a controller.

The communication unit 14 is a communication means or unit for connecting the drone 10 to the network N1. The communication unit 14 is, for example, a circuit for communicating with another device (e.g., the user terminal 20, the center server 30, the SNS server 40 or the like) via the network N1 by making use of a mobile communication service (e.g., a telephone communication network such as 5G (5th Generation), 4G (4th Generation), 3G (3rd Generation), LTE (Long Term Evolution) or the like), or wireless communication such as Wi-Fi (registered trademark), Bluetooth (registered trademark) or the like.

The camera 15 is a device that takes pictures or images of an area around the drone 10. The camera 15 takes pictures by using an imaging element such as a CCD (Charge Coupled Device) image sensor, a CMOS (Complementary Metal Oxide Semiconductor) image sensor or the like. The images thus obtained by taking pictures may be either still images or moving images.

The position information sensor 16 obtains position information (e.g., latitude and longitude) of the drone 10 at predetermined intervals. The position information sensor 16 is, for example, a GPS (Global Positioning System) receiver unit, a wireless communication unit or the like. The information obtained by the position information sensor 16 is recorded in, for example, the auxiliary storage unit 13 or the like, and transmitted to the center server 30.

The environmental information sensor 17 is a means or unit for sensing the state of the drone 10 or sensing the area around the drone 10. As an example of the sensor for sensing the state of the drone 10, there is mentioned a gyro sensor, an acceleration sensor, an azimuth sensor, or the like. Also, as an example of the sensor for sensing the area around the drone 10, there is mentioned a stereo camera, a laser scanner, a LIDAR, a radar, or the like. The camera 15 as described above can also be used as the environmental information sensor 17. The data obtained by the environmental information sensor 17 is also referred to as "environmental data".

The drive unit 18 is a device for flying the drone 10 based on a control command generated by the processor 11. The drive unit 18 is configured to include, for example, a plurality of motors or the like for driving rotors included in the drone 10, so that the plurality of motors or the like are driven in accordance with the control command, thereby to achieve the autonomous flight of the drone 10.

Next, the user terminal 20 will be described. The user terminal 20 is a smart phone, a mobile phone, a tablet terminal, a personal information terminal, a wearable computer (such as a smart watch or the like), or a small computer such as a personal computer (PC). The user terminal 20 includes a processor 21, a main storage unit 22, an auxiliary storage unit 23, an input unit 24, a display 25, a position information sensor 26, a communication unit 27, and a camera 28. These components are connected to one another by means of a bus. The processor 21, the main storage unit 22 and the auxiliary storage unit 23 are the same as the processor 31, the main storage unit 32 and the auxiliary storage unit 33 of the center server 30, respectively, and hence, the description thereof will be omitted. In addition, the position information sensor 26 and the camera 28 are the same as the position information sensor 16 and the camera 15 of the drone 10. The information obtained by the position information sensor 26 and the images taken by the camera 28 are recorded in, for example, the auxiliary storage unit 23 or the like, and are transmitted to the center server 30.

The input unit 24 is a means or unit for receiving an input operation performed by a user, and is, for example, a touch panel, a mouse, a keyboard, a push button, or the like. The display 25 is a means or unit for presenting information to the user, and is, for example, an LCD (Liquid Crystal Display), an EL (Electroluminescence) panel, or the like. The input unit 24 and the display 25 may be configured as a single touch panel display. The communication unit 27 is a communication means or unit for connecting the user terminal 20 to the network N1. The communication unit 27 is a circuit for communicating with another device (e.g., the drone 10, the center server 30, the SNS server 40 or the like) via the network N1 by making use of a mobile communication service (e.g., a telephone communication network such as 5G (5th Generation), 4G (4th Generation), 3G (3rd Generation), LTE (Long Term Evolution) or the like), or a wireless communication network such as Wi-Fi (registered trademark), Bluetooth (registered trademark) or the like.

The SNS server 40 has a configuration of a general computer. The SNS server 40 is, for example, a server that manages the SNS or a server that is able to obtain information on the SNS. The SNS server 40 includes a processor 41, a main storage unit 42, an auxiliary storage unit 43, and a communication unit 44. These components are connected to one another by means of a bus. The processor 41, the main storage unit 42, the auxiliary storage unit 43, and the communication unit 44 are the same as the processor 31, the main storage unit 32, the auxiliary storage unit 33, and the communication unit 34 of the center server 30, respectively, and hence, the description thereof will be omitted.

Figure 3:
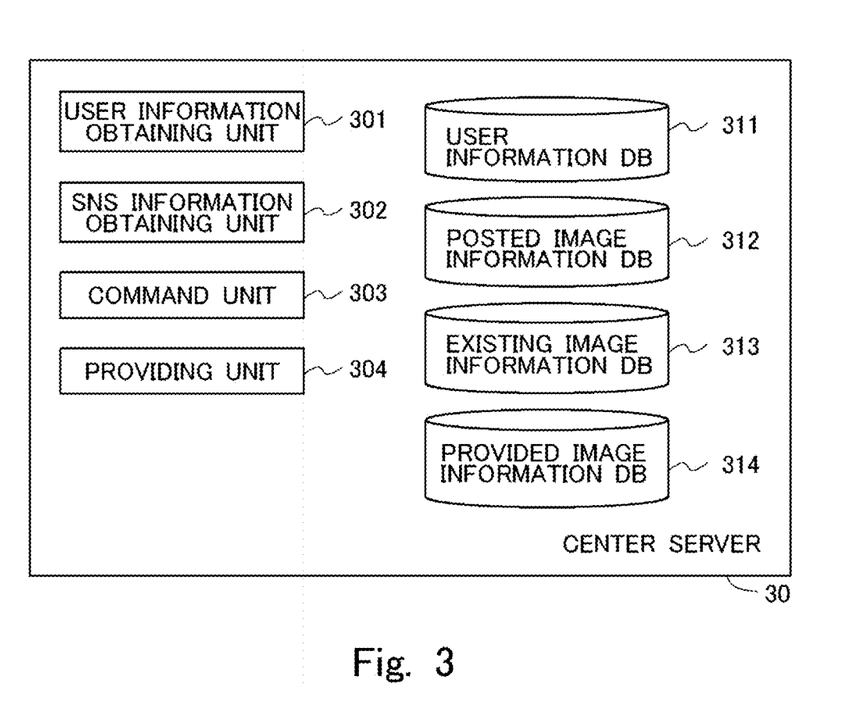
FIG. 3 is a diagram illustrating a functional configuration of the center server.

Then, the functions of the center server 30 will be described. FIG. 3 is a view illustrating an example of a functional configuration of the center server 30. The center server 30 includes, as its functional components, a user information obtaining unit 301, an SNS information obtaining unit 302, a command unit 303, a providing unit 304, a user information DB 311, a posted image information DB 312, an existing image information DB 313, and a provided image information DB 314. The processor 31 of the center server 30 executes the processing of the user information obtaining unit 301, the SNS information obtaining unit 302, the command unit 303 and the providing unit 304 by means of a computer program on the main storage unit 32. However, any of the individual functional components or a part of the processing thereof may be implemented by a hardware circuit.

The user information DB 311, the posted image information DB 312, the existing image information DB 313, and the provided image information DB 314 are built by a program of a database management system (DBMS) executed by the processor 31 to manage the data stored in the auxiliary storage unit 33. The user information DB 311, the posted image information DB 312, the existing image information DB 313, and the provided image information DB 314 are, for example, relational databases.

Here, note that any of the functional components of the center server 30 or a part of the processing thereof may be implemented by another or other computers connected to the network N1.

The user information obtaining unit 301 obtains information of the user who makes use of the system 1 (hereinafter, also referred to as user information). The user information includes a user ID, which is an identifier unique to the user, and information about an SNS account of the user. The user information is transmitted from the user terminal 20 to the center server 30. Upon obtaining the user information, the user information obtaining unit 301 stores the user information in the user information DB 311, which will be described later.

The SNS information obtaining unit 302 obtains from the SNS server 40 an image posted to the SNS by the user or an image for which the user has pressed a social button (e.g., has pressed a like button or entered a number of stars) on the SNS (hereinafter, these images are also referred to as "posted images"). The SNS information obtaining unit 302 stores the posted image thus obtained in the posted image information DB 312, which will be described later. The posted image is associated with position information, which is information on a location or position at which the image has been taken, and time point information, which is information on a time point at which the image has been taken.

In addition, the SNS information obtaining unit 302 obtains from the SNS server 40 the images posted by a third party other than the user (hereinafter, also referred to as "existing images"). The images to be obtained may be limited to the images taken in a predetermined area. Here, note that the predetermined area may be an area of the same municipality. The SNS information obtaining unit 302 stores the existing images thus obtained in the existing image information DB 313, which will be described later. Also, note that alternatively, an image may be obtained from a monitoring camera or a live camera, or an image may be obtained from the Internet, or an image provided by a third party may be obtained.

Then, the command unit 303 generates, based on the posted image stored in the posted image information DB 312, a command for the drone 10 to take an image (hereinafter, also referred to as a flight command). The command unit 303 performs obtaining a feature amount of an image preferred by the user, obtaining a place (or location) and a time point at which an image corresponding to the image preferred by the user can be taken, and generating a flight command for causing the drone 10 to take an image at the place and the time point.

The command unit 303 obtains, for example, a feature amount of each image stored in the posted image information DB 312. The feature amount is obtained on the basis of, for example, a color, a texture, or a context. Upon obtaining the feature amount of each image stored in the posted image information DB 312, the command unit 303 stores it in the posted image information DB 312. Here, note that the method of obtaining a feature amount is not limited. Similarly, the command unit 303 obtains a feature amount of an image stored in the existing image information DB 313, which will be described later, and stores the feature amount thus obtained in the existing image information DB 313.

Then, the command unit 303 extracts an existing image having the same feature as that of the posted image from among the images stored in the existing image information DB 313, by comparing a feature amount of an image stored in the posted image information DB 312 with a feature amount of an image stored in the existing image information DB 313. The existing image having the same feature is, for example, an image that can be considered to be similar to the posted image. Here, note that the command unit 303 may extract the image having the same feature, for example, by means of pattern matching. Based on the position information and the time point information of the existing image extracted by the command unit 303 (hereinafter, referred to as an extracted image"), the command unit 303 generates a flight command so that the drone 10 is caused to take an image at the place and the time point at which the extracted image was taken.

Here, note that in cases where there are a plurality of drones 10 that can take pictures or images, the command unit 303 may select, for example, a drone 10 closest to the place to be imaged (or photographed), select a drone 10 with the highest battery charging rate, or select a drone 10 at random. An image taken by a drone 10 is transmitted from the drone 10 to the center server 30, and the command unit 303 stores the image in the provided image information DB 314, which will be described later. In the provided image information DB 314, the user ID of the user providing the image is associated with the image to be stored therein.

The providing unit 304 transmits an image stored in the provided image information DB 314 to the user terminal 20. For example, the providing unit 304 may transmit a provided image to the user terminal 20 at each predetermined time interval or each time the provided image is stored in the provided image information DB 314. In addition, the providing unit 304 may transmit a provided image to the user terminal 20 on the SNS via the SNS server 40. Also, the providing unit 304 may transmit a provided image stored in the provided image information DB 314 to the user terminal 20, when the provision of an image is requested from the user terminal 20.

Figure 4:
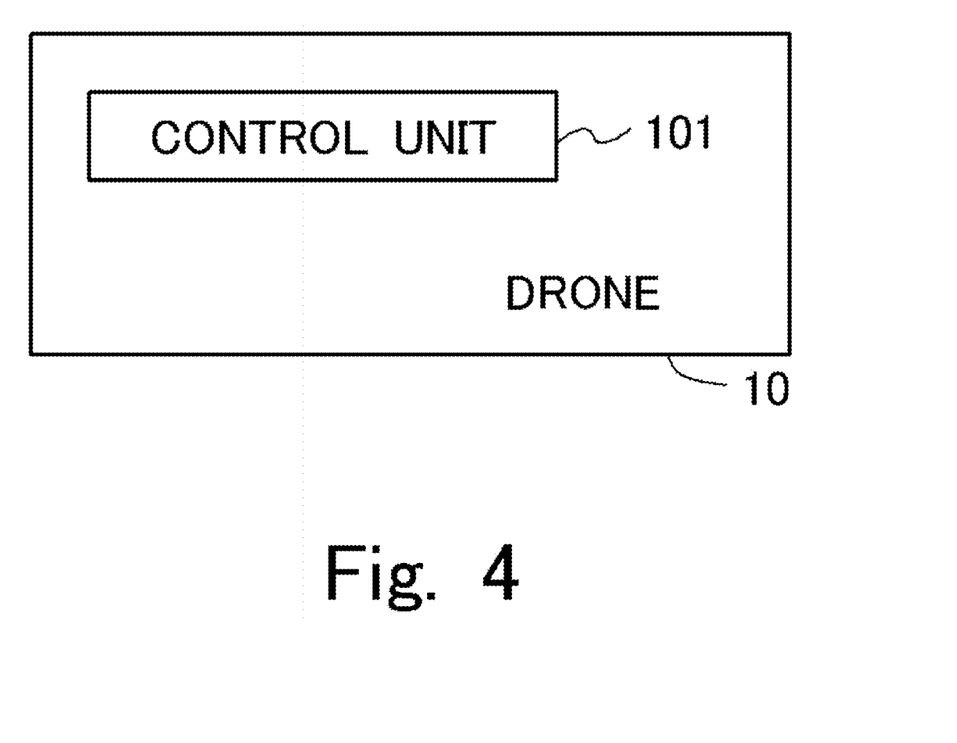
FIG. 4 is a diagram illustrating a functional configuration of the drone.

Now, the functions of the drone 10 will be described. FIG. 4 is a diagram illustrating a functional configuration of the drone 10. The drone 10 includes a control unit 101 as a functional component. The processor 11 of the drone 10 executes the processing of the control unit 101 by a computer program on the main storage unit 12. However, some or all of the processing of the control unit 101 may be implemented by a hardware circuit, or may be implemented by another or other computers connected to the network N1.

The control unit 101 controls the drone 10 during the autonomous flight of the drone 10. The control unit 101 generates a control command for controlling the drive unit 18 by using the environmental data detected by the environmental information sensor 17. The control unit 101 controls, for example, the ascent, descent, forward movement, backward movement, turning and the like of the drone 10 by controlling the plurality of motors to generate differences in rotation speed between the plurality of rotors.

The control unit 101 generates, for example, a flight trajectory of the drone 10 based on the environmental data, and controls the drive unit 18 so that the drone 10 can fly along the flight trajectory. Here, note that as a method of causing the drone 10 to fly in an autonomous manner, there can be adopted a known method. The control unit 101 may perform feedback control based on a detected value of the environmental information sensor 17 during the autonomous flight of the drone 10.

In addition, the control unit 101 also takes an image. According to the position information and the time point information received from the center server 30, the control unit 101 controls the drive unit 18 and the camera 15 so as to take an image at that position and at that time point. For example, upon obtaining the position information and the time point information from the center server 30, the control unit 101 generates a control command so as to cause the drone 10 to move to the position at the time point and to take an image by means of the camera 15 when arriving at the position, and transmits the image thus taken to the center server 30.

Here, note that a flight route from the current location to the location or position at which an image is to be taken (hereinafter, also referred to as an imaging location or position) may be generated by the control unit 101 of the drone 10, or may be generated by the command unit 303 of the center server 30. In cases where the flight route is generated in the center server 30, the flight route thus generated is transmitted from the center server 30 to the drone 10. Then, the control unit 101 may control the drive unit 18 so that the drone 10 can fly according to the generated flight route.

Figure 5:
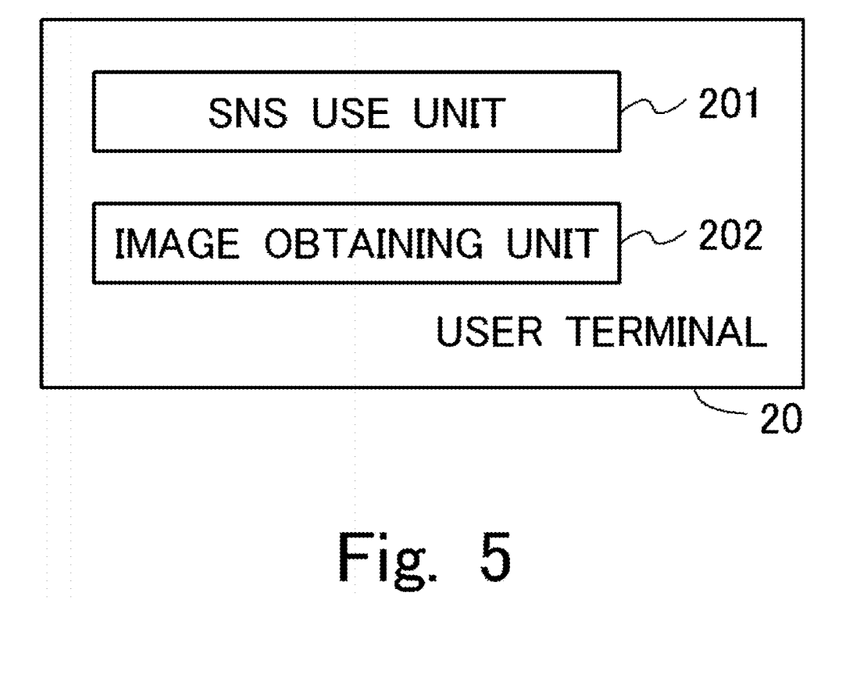
FIG. 5 is a diagram illustrating an example of a functional configuration of the user terminal.

Now, the functions of the user terminal 20 will be described. FIG. 5 is a diagram illustrating a functional configuration of the user terminal 20. The user terminal 20 includes, as its functional components, an SNS use unit 201 and an image obtaining unit 202. The processor 21 of the user terminal 20 performs the processing of the SNS use unit 201 and the image obtaining unit 202 by means of a computer program(s) on the main storage unit 22. However, the SNS use unit 201, the image obtaining unit 202, or a part of the processing thereof may be implemented by a hardware circuit.

The SNS use unit 201 displays an operation screen on the display 25, and transmits to the SNS server 40 information corresponding to an input to the input unit 24 by a user. For example, the SNS use unit 201 displays the operation screen for the SNS or the like on the touch panel display, and, when the user makes some input on the operation screen or the like, the SNS use unit 201 transmits information corresponding to the input to the SNS server 40. For example, an SNS post and a social button (e.g., a like button) are displayed on the touch panel display, and in cases where the user selects (e.g., taps) the social button, information indicating the selection is transmitted to the SNS server 40. Also, for example, when a post to the SNS is inputted to the user terminal 20, information on the post is transmitted to the SNS server 40. For example, the user can post an image taken by the camera 28.

In addition, the SNS use unit 201 can cause the display 25 to display an image that has been published on the SNS. For example, in cases where a predetermined input is made by the user so as to display an image on the display 25, the SNS use unit 201 requests the center server 30 to provide the image. Then, when the center server 30 transmits the image in response to the request, the SNS use unit 201 displays the image on the display 25.

The image obtaining unit 202 obtains an image from the center server 30. The image thus obtained can also be displayed on the display 25 for the user to be able to view.

For example, when the user taps on a thumbnail of an image on the display 25, the image may be displayed on the display 25. The user may view this image on the SNS.

Next, the functions of the SNS server 40 will be described. The SNS server 40 is a server that manages the SNS. The SNS server 40 manages users' posts to the SNS and the like. The SNS server 40 can communicate with the user terminal 20 and the center server 30 via the network N1. The SNS server 40 stores, in the auxiliary storage unit 43, the registration information about each user, the posts (e.g., messages or images) of each user, the places where each user has made the posts, the times at which each user has made the posts, the number of a social button corresponding to each post that has been pressed, and the like. The SNS server 40 provides information about the SNS based on requests from the user terminal 20 and the center server 30.

Figure 6:
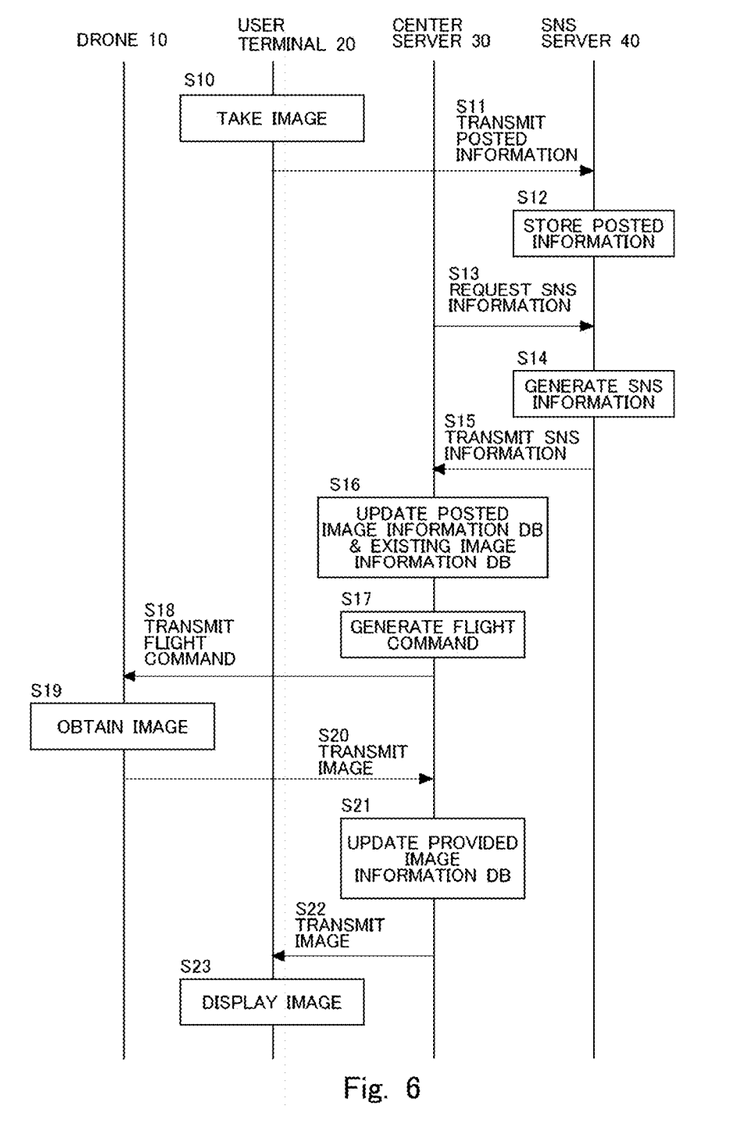
FIG. 6 is a sequence diagram of the processing of the system.

Then, the processing of the system 1 as a whole will be described. FIG. 6 is a sequence diagram of the processing of the system 1. Here, note that an SNS account corresponding to a user is assumed to have been registered in advance in the center server 30. First, the user takes an image by using the user terminal 20 (S10). Then, the user operates the user terminal 20 to post the image on the SNS. At this time, posting information including the image and the SNS account of the user is transmitted from the user terminal 20 to the SNS server 40 (S11). Upon receipt of the posting information, the SNS server 40 stores the posting information in the auxiliary storage unit 43 (S13).

In addition, the center server 30 requests the SNS server 40 to transmit a posted image and an existing image (S13). The SNS server 40 generates information on the posted image and the existing image (SNS information) to be transmitted to the center server 30 (S14), so that the SNS information is transmitted to the center server 30 (S15). Here, note that the information about the existing image includes position information and time point information. The center server 30, which has received the SNS information, updates the posted image information DB 312 and the existing image information DB 313 (S16). Then, the center server 30 estimates, based on the posted image and the existing image, a position (location) and a time point at which an image preferred by the user can be taken, and generates a flight command so that the drone 10 can take an image at the position and at the time point thus estimated (S17). The flight command generated is transmitted to a drone 10 (S18). This drone 10 is, for example, a drone with its current location nearest to the imaging position.

The drone 10, which has received the flight command, generates a control command for controlling the drive unit 18 based on the flight command. Then, in the drone 10, flight control is performed in accordance with the control command. In this flight control, the drone 10 is controlled to perform moving to the position at which an image is taken, and taking an image at the position (S19). The drone 10 transmits the image thus taken to the center server 30 (S20).

In the center server 30 that has received the image from the drone 10, the image is stored in the provided image information DB 314, thereby updating the provided image information DB 314. In addition, the center server 30 transmits the provided image to the user terminal 20 (S22). In the user terminal 20 that has received the provided image, the provided image or a thumbnail thereof is displayed on the display 25 (S23).

Figure 7:
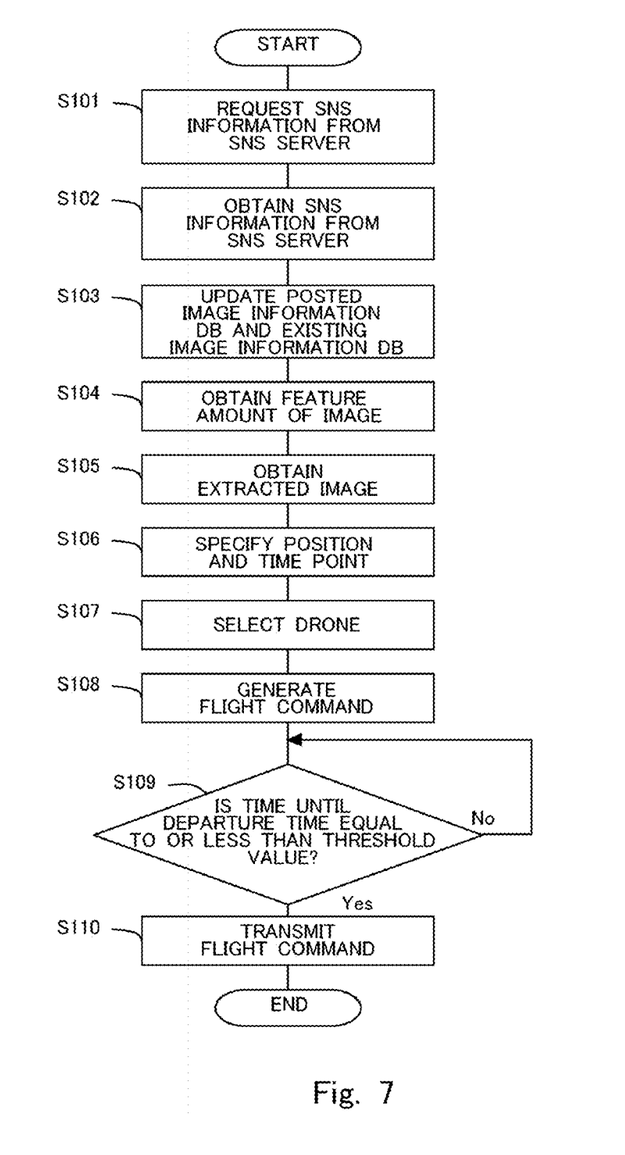
FIG. 7 is a flowchart of command generation processing according to a first embodiment.

Next, generation processing of a flight command (hereinafter also referred to as command generation processing) in the center server 30 will be described. The command generation processing corresponds to the processing from S13 to S18 in FIG. 6. FIG. 7 is a flowchart of the command generation processing according to the present embodiment. The command generation processing illustrated in FIG. 7 is executed at predetermined time intervals in the center server 30. Here, note that the following explanation will be made on the assumption that necessary information has been stored in the user information DB 311.

In step S101, the SNS information obtaining unit 302 requests the SNS server 40 to transmit SNS information. Here, the SNS information obtaining unit 302 transmits, to the SNS server 40, information requesting the transmission of an image (posted image) posted in an SNS account corresponding to each user stored in the user information DB 311 and an image (existing image) posted by a third party in a predetermined area. The predetermined area is, for example, a city, a town, or a village that includes the current position or location of the user. Then, in step S102, the SNS information obtaining unit 302 obtains SNS information from the SNS server 40. In other words, the SNS information obtaining unit 302 obtains a posted image and an existing image. The SNS information obtaining unit 302 waits until it receives the SNS information from the SNS server 40. In step S103, the SNS information obtaining unit 302 stores information about the posted image thus received in the posted image information DB 312 and stores information about the existing image thus received in the existing image information DB 313, thereby updating the posted image information DB 312 and the existing image information DB 313.

In step S104, the command unit 303 obtains a feature amount of each posted image stored in the posted image information DB 312 and a feature amount of each existing image stored in the existing image information DB 313. Here, note that the command unit 303 stores a feature amount of each posted image thus obtained in the posted image information DB 312 and a feature amount of each existing image thus obtained in the existing image information DB 313. In step S105, the command unit 303 obtains an extracted image. Specifically, the command unit 303 compares a feature amount of an image stored in the posted image information DB 312 with a feature amount of each image stored in the existing image information DB 313 thereby to extract an existing image having the same feature as a posted image from among the images stored in the existing image information DB 313. The command unit 303, for example, compares the feature amount of the posted image with the feature amount of each existing image, and obtains an existing image, which is considered to be similar to the posted image, as an extracted image. The method of comparison at this time is not limited. In step S106, the command unit 303 specifies the position information and the time point information associated with the extracted image.

In step S107, the command unit 303 selects a drone 10 that takes images. For example, the command unit 303 selects a drone 10 that has the shortest distance from the position specified in step S106. In step S108, the command unit 303 generates a flight command. The flight command is generated such that the drone 10 flies to the position specified in step S106 and an image is taken by the camera 15 at the position. The flight command includes information about the position or the like at which an image is taken. In step S109, the command unit 303 determines whether or not the time until the time point specified in step S106 is equal to or less than a threshold value. The threshold value is set in accordance with, for example, the time required for the drone 10 to arrive at the position at which an image is to be taken. When an affirmative determination is made in step S109, the processing or routine proceeds to step S110, whereas when a negative determination is made, the processing in step S109 is executed again. Then, in step S110, the command unit 303 transmits the flight command to the drone 10 selected in step S107.

Figure 8:
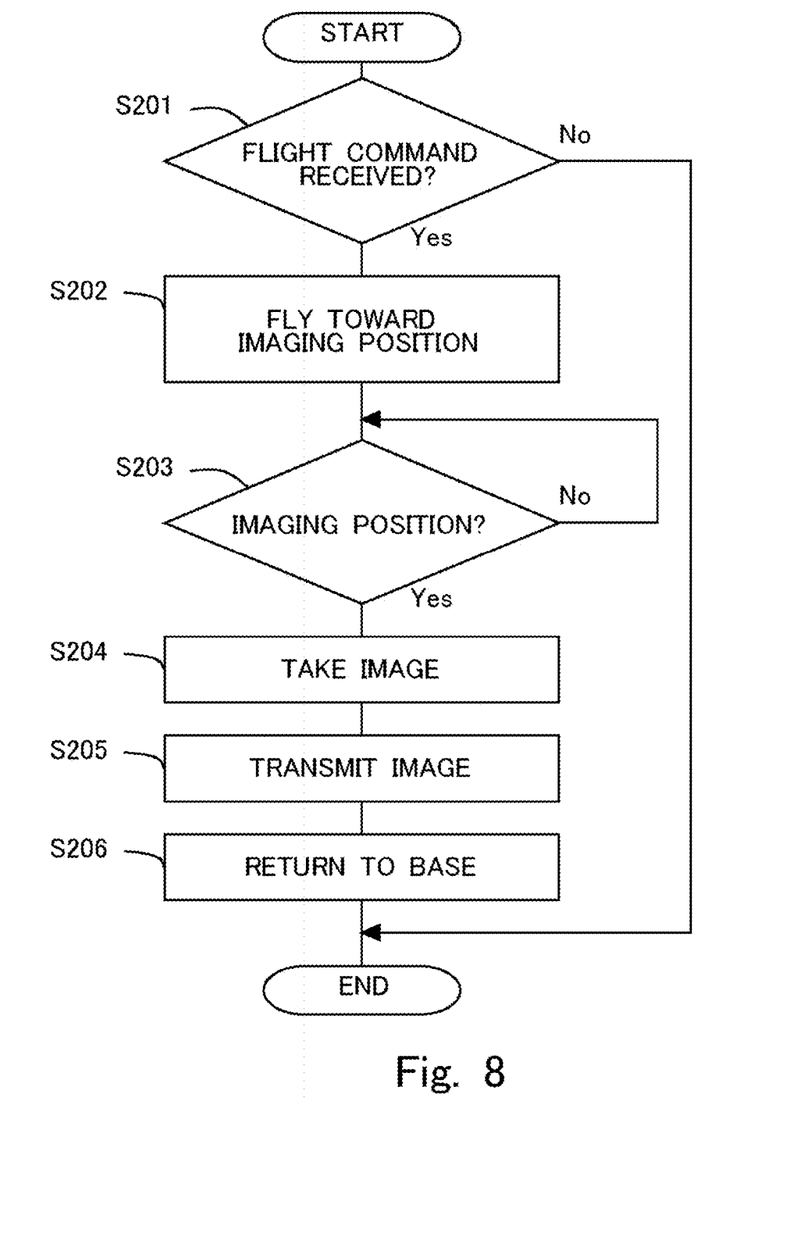
FIG. 8 is a flowchart of imaging processing according to the first embodiment.

Then, imaging or photographing processing in the drone 10 will be described. The imaging processing corresponds to the processing from S19 to S20 in FIG. 6. FIG. 8 is a flowchart of the imaging processing according to the present embodiment. The imaging processing illustrated in FIG. 8 is executed in the drone 10 at predetermined time intervals.

In step S201, the control unit 101 determines whether or not a flight command has been received from the center server 30. When an affirmative determination is made in step S201, the processing or routine proceeds to step S202, whereas when a negative determination is made, this routine is ended. In step S202, the control unit 101 generates a control command in accordance with the flight command thereby to cause the drone 10 to fly toward the imaging position or location at which an image is to be taken (a predetermined position). At this time, the control unit 101 controls the drive unit 18 thereby to perform flight control.

In step S203, the control unit 101 determines whether or not the drone 10 has arrived at the imaging position. The control unit 101 determines whether or not the drone 10 has arrived at the imaging position, for example, by comparing the position information obtained by the position information sensor 16 with the information on the imaging position obtained from the center server 30. When an affirmative determination is made in step S203, the processing proceeds to step S204, whereas when a negative determination is made, the processing of step S203 is executed again.

In step S204, the control unit 101 takes an image by using the camera 15. At this time, the control unit 101 may control the orientation of the drone 10 or the orientation of the camera 15 so that the camera 15 faces a specific direction. The specific direction is a direction in which an image that matches the user's preference can be taken, and which is specified by the center server 30 based on the extracted image, for example. Then, the center server 30 transmits the information on the specific direction to the drone 10 along with the flight command. In step S205, the control unit 101 transmits the image thus taken to the center server 30. The image to be transmitted is associated with, for example, information capable of identifying the user to whom the image is to be provided (i.e., identification information of the drone 10, the user ID transmitted from the center server 30, or information about the extracted image transmitted from the center server 30). In step S206, the control unit 101 causes the drone 10 to fly so as to return to a base of the drone 10. In the base of the drone 10, for example, maintenance or charging of the drone 10 is performed.

Figure 9:
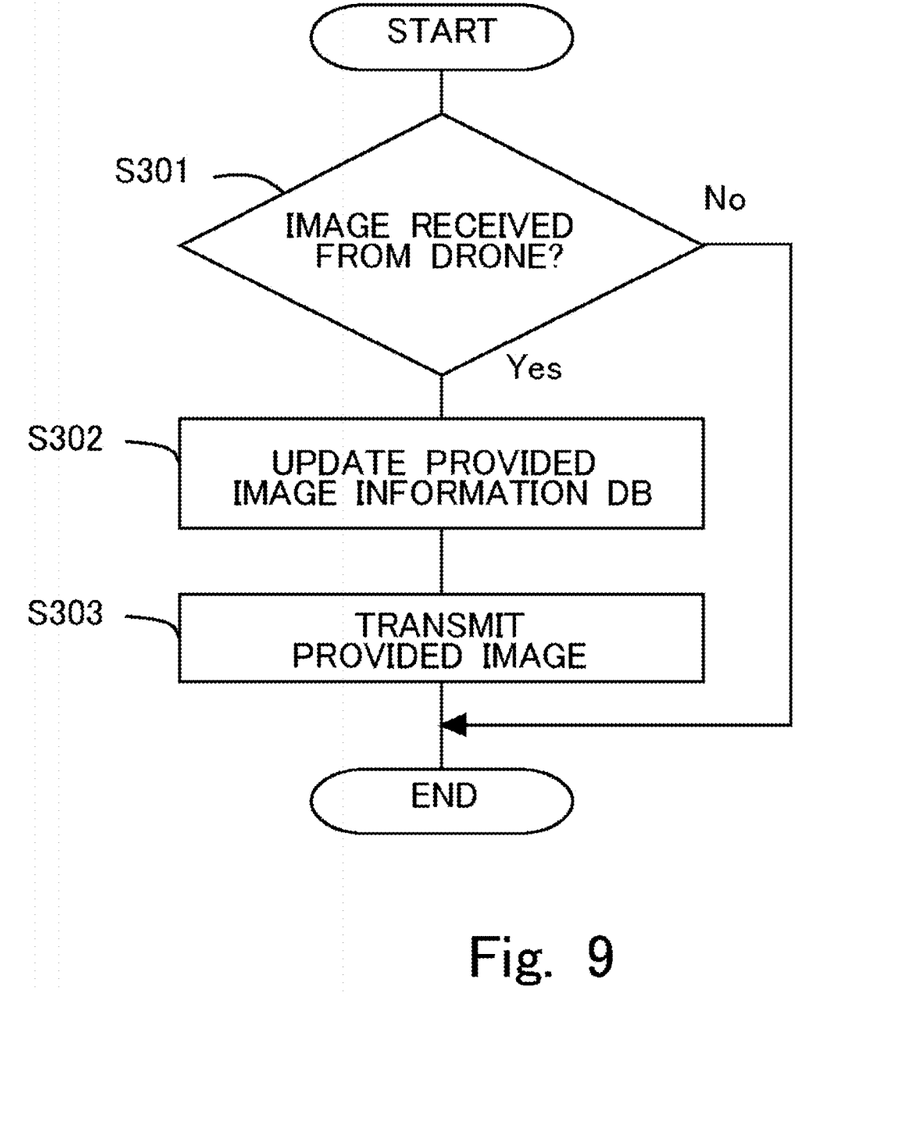
FIG. 9 is a flowchart of image providing processing according to the first embodiment.

Next, image providing processing in the center server 30 will be described. The image providing processing corresponds to processing from S21 to S22 in FIG. 6. FIG. 9 is a flowchart of the image providing processing according to the present embodiment. The image providing processing illustrated in FIG. 9 is executed at predetermined time intervals in the center server 30. Here, note that the following explanation will be made on the assumption that necessary information has been stored in the user information DB 311.

In step S301, the providing unit 304 determines whether or not an image has been received from the drone 10. When an affirmative determination is made in step S301, the processing or routine proceeds to step S302, whereas when a negative determination is made, this routine is ended. In step S302, the providing unit 304 updates the provided image information DB 314 by storing information about the received image in the provided image information DB 314. In the provided image information DB 314, for example, an image is stored in association with a corresponding user ID based on the identification information of the drone 10. In step S303, the providing unit 304 transmits the provided image to the user terminal 20 of a corresponding user.

As described above, according to the present embodiment, an autonomously movable drone 10 takes an image according to the preference of a user. Then, the center server 30 transmits the image to the user terminal 20 of the user. Therefore, the user can automatically obtain the image matching his/her preference. In addition, the user can obtain information on an area in which the user lives.

Second Embodiment

The command unit 303 of the center server 30 according to a second embodiment selects predetermined positions (locations) to dispatch drones 10 according to priority. For example, in cases where images are taken at a plurality of positions (locations) at the same time, there may be a case where the number of drones 10 is insufficient in some cases. In this case, the drones 10 may be preferentially dispatched to positions with high priority. The priority is set by the command unit 303 based on, for example, the frequency of occurrence of a phenomenon to be imaged, the small number of people who visit a place to be imaged, the small number of existing images at the place to be imaged, weather conditions, or the like. This priority may be calculated based on, for example, a score calculated for each imaging position. This score may be calculated based on, for example, the frequency of occurrence, the number of visitors, the number of existing images, and weather information. For example, scores corresponding to the frequency of occurrence, the number of visitors, the number of existing images, and weather information, respectively, have been set in advance, and by adding or multiplying the respective scores for each imaging position, the priority of that imaging position is calculated. Note that the method of calculating the priority is not limited to this.

For example, the lower the frequency of occurrence of a phenomenon to be imaged, the larger is made the score so that the priority is higher. For example, a phenomenon that occurs only a few times a year (e.g., a rainbow or a full moon) will have a larger score than a scene or view that can be seen every day. Also, for example, the more the number of people visiting a location or place to be imaged, the smaller is made the score so that the priority becomes lower. For example, a location or place that is visited by more people will have a lower scarcity value because it is thought that there are more existing images, so the score will be made smaller. Similarly, the more the existing images, the smaller is made the score so that the priority becomes lower. In addition, for example, on clear days, the score is increased so that the priority is higher because the view becomes easier to see than on cloudy and rainy days. On the other hand, for example, in cases there are few images taken on rainy days in the existing images, the score may be increased so that the priority of rainy days is higher. Also, in cases where there is a high probability of precipitation based on weather forecast, the score may be increased so that images can be taken before rain falls.

The command unit 303 adds up the above scores for each imaging position, for example, and sets the value thus obtained as the priority of each imaging position. For example, the drones 10 may be dispatched to imaging positions having a priority equal to or higher than a predetermined priority, or the drones 10 may be dispatched in descending order of priority.

Figure 10:
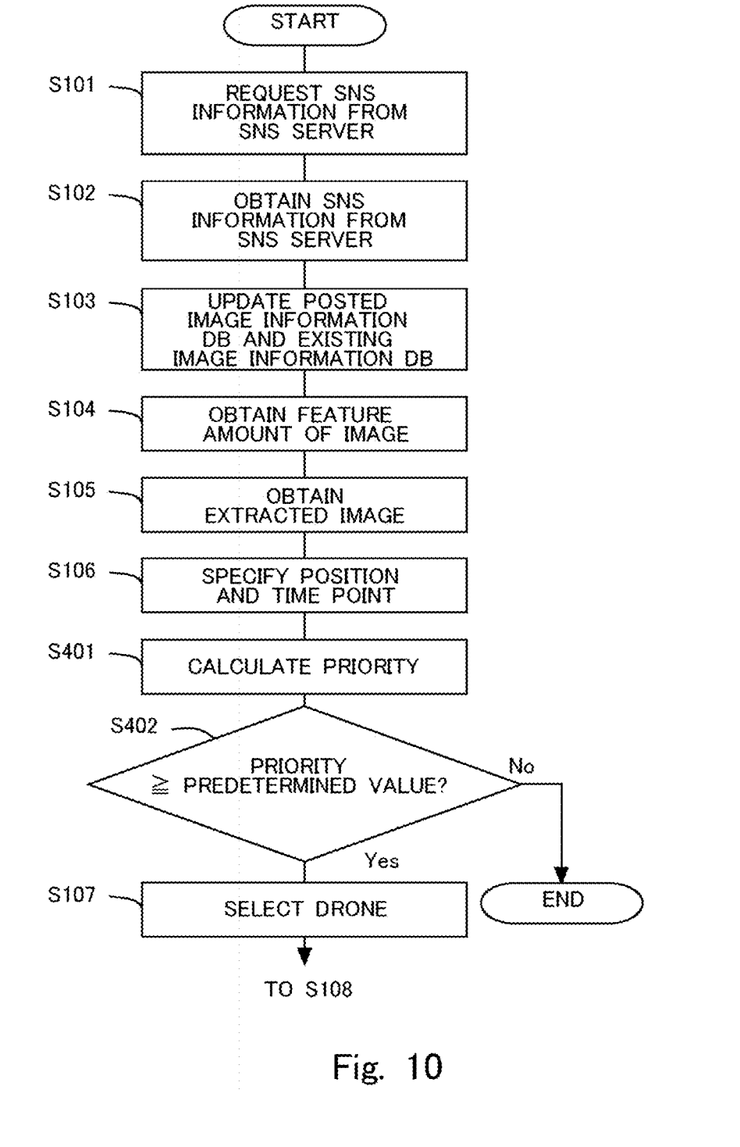
FIG. 10 is a flowchart of command generation processing according to a second embodiment.

Next, the command generation processing in the center server 30 will be described. FIG. 10 is a flowchart of the command generation processing according to the second embodiment. The command generation processing illustrated in FIG. 10 is executed at predetermined time intervals in the center server 30. Here, note that the steps in which the same processing is performed as in the flowchart illustrated in FIG. 7 are denoted by the same reference signs, and the description thereof will be omitted. Also, the processing in and after step S107 is the same as in the flowchart illustrated in FIG. 7, so the illustration thereof will be omitted.

In the flowchart illustrated in FIG. 10, when the processing of step S106 ends, the processing or routine proceeds to step S401. In step S401, the command unit 303 calculates the priority of the position corresponding to the extracted image obtained in step S105. Then, in step S402, the command unit 303 determines whether or not the priority thus calculated is equal to or greater than a predetermined value. The predetermined value is set as a threshold value at which imaging (photographing) by the drone 10 is performed. When an affirmative determination is made in step S402, the processing or routine proceeds to step S107, whereas when a negative determination is made, this routine is ended.

As described above, according to the second embodiment, images are taken in accordance with priority, and hence, it is possible to provide images with higher scarcity to a user.

Other Embodiments

The above-described embodiments are merely examples, but the present disclosure can be implemented with appropriate modifications without departing from the spirit thereof.

The processing and means (devices, units, etc.) described in the present disclosure can be freely combined and implemented as long as no technical contradiction occurs.

In addition, the processing described as being performed by a single device or unit may be shared and performed by a plurality of devices or units. Alternatively, the processing described as being performed by different devices or units may be performed by a single device or unit. In a computer system, it is possible to flexibly change the hardware configuration (server configuration) that can achieve each function of the computer system. For example, the center server 30 may include a part or some of the functions of the drone 10. Also, for example, the drone 10 may include a part or all of the functions of the center server 30.

Moreover, in the above-described embodiments, a drone 10 has been described as an example of a moving object, but instead of this, the present invention can be applied to, for example, a vehicle capable of traveling autonomously.

Further, in the above-described embodiments, the center server 30 directly transmits an image to a user terminal 20, but as an alternative method, an image may be transmitted via the SNS server 40. This allows a user to view or browse the image on the SNS, and hence, there is no need to separately install an application on the user terminal 20.

Furthermore, in the above-described embodiments, an existing image is obtained, but the obtaining of an existing image is not essential. For example, information may be obtained from a message included in an SNS post. For example, in cases where there is a post that includes a message indicating that a rainbow is appearing or that a full moon is visible, the imaging position thereof may be specified from the position information.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium connectable to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read only memory (ROM), a random access memory (RAM), an EPROM, an EEPROM, a magnetic card, a flash memory, an optical card, or any type of medium suitable for storing electronic commands or instructions.

What is claimed is:

1. An information processing apparatus, comprising a controller configured to perform:
   obtaining information about a condition for an image that is provided to a user, and that corresponds to a preference of the user;
   specifying, based on information obtained from a second user other than the user, at least one predetermined position at which an image satisfying the condition can be taken, the information obtained from the second user being about a position associated with an image posted by the second user to a social networking service; and
   generating a command for a moving object to move to the at least one predetermined position and to take an image, and transmitting the command to the moving object.

2. The information processing apparatus according to claim 1, wherein
   the controller is configured to perform obtaining, as the information about the condition, information about an image posted by the user to the social networking service.

3. The information processing apparatus according to claim 1, wherein
   the controller is configured to perform further specifying a predetermined time point at which the image satisfying the condition can be taken at the at least one predetermined position.

4. The information processing apparatus according to claim 3, wherein
   the controller is configured to perform specifying predetermined time point based on information about a time point associated with the image posted to the social networking service by the second user.

5. The information processing apparatus according to claim 1, wherein
   in cases where the at least one predetermined position includes a plurality of predetermined positions, the controller is configured to perform
   calculating a priority of each predetermined position of the plurality of predetermined positions,
   generating a command for the moving object to move to a predetermined position where the priority is higher than a predetermined priority and to take an image, and
   transmitting the command to the moving object.

6. The information processing apparatus according to claim 5, wherein
the controller is configured to perform setting the priority to be higher for a position with a lower frequency of occurrence of a phenomenon in which the image satisfying the condition can be taken.

7. The information processing apparatus according to claim 5, wherein
the controller is configured to perform setting the priority to be higher at a position where a number of images taken in the past is smaller.

8. The information processing apparatus according to claim 5, wherein
the controller is configured to perform setting the priority to be higher for a position with a smaller number of visiting users.

9. The information processing apparatus according to claim 1, wherein
the controller is configured to further perform:
obtaining the image taken by the moving object at the at least one predetermined position from the moving object; and
transmitting the image obtained from the moving object to a terminal of the user.

10. An information processing method, comprising causing a computer to perform:
obtaining information about a condition for an image that is provided to a user, and that corresponds to a preference of the user;
specifying, based on information obtained from a second user other than the user, at least one predetermined position at which an image satisfying the condition can be taken, the information obtained from the second user being about a position associated with an image posted by the second user to a social networking service; and
generating a command for a moving object to move to the at least one predetermined position and to take an image, and transmitting the command to the moving object.

11. The information processing method according to claim 10, further comprising causing the computer to obtain, as the information about the condition, information about an image posted by the user to the social networking service.

12. The information processing method according to claim 10, further comprising causing the computer to specify a predetermined time point at which the image satisfying the condition can be taken at the at least one predetermined position.

13. A non-transitory storage medium storing a program configured to cause a computer to perform:
obtaining information about a condition for an image that is provided to a user, and that corresponds to a preference of the user;
specifying, based on information obtained from a second user other than the user, at least one predetermined position at which an image satisfying the condition can be taken, the information obtained from the second user being about a position associated with an image posted by the second user to a social networking service; and
generating a command for a moving object to move to the at least one predetermined position and to take an image, and transmitting the command to the moving object.

14. The non-transitory storage medium according to claim 13, wherein
the program is configured to further cause the computer to perform obtaining, as the information about the condition, information about an image posted by the user to the social networking service.

* * * * *